Oct. 1, 1968　　　R. A. CASALOU　　　3,403,579
OUTSIDE REAR VIEW REMOTE CONTROLLED MIRROR FOR VEHICLES
Filed Nov. 22, 1966
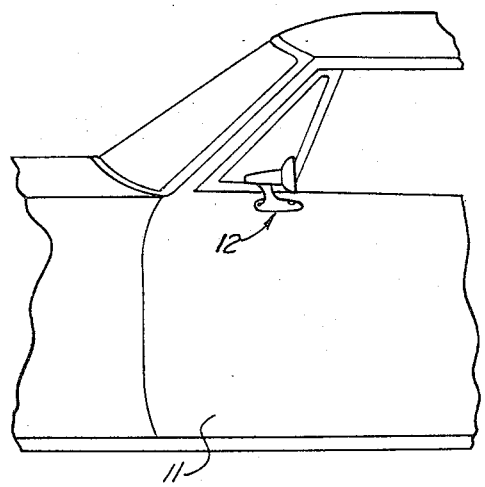
FIG. 1
FIG. 3
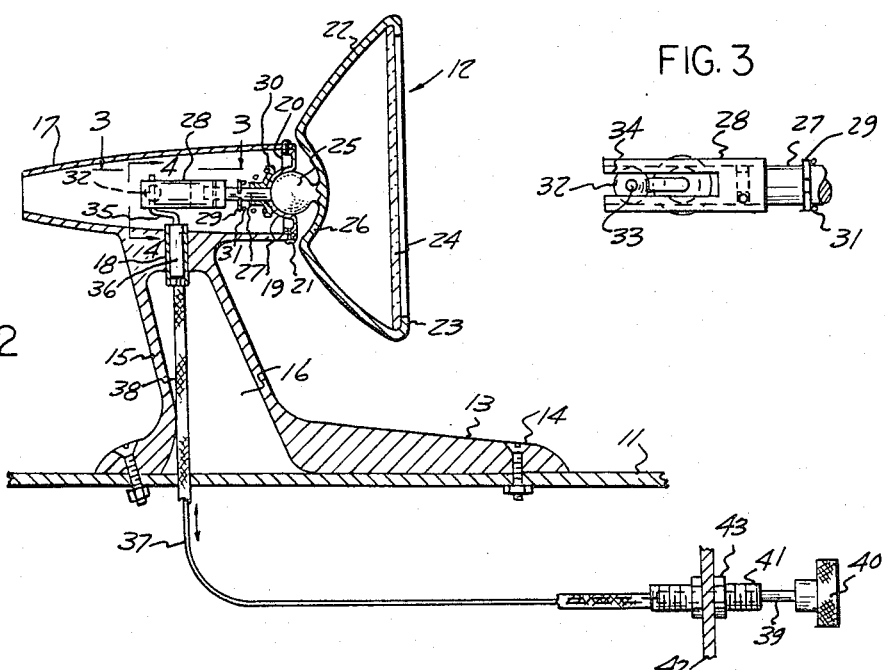
FIG. 2
FIG. 4
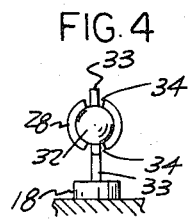
INVENTOR
ROBERT A. CASALOU
BY Cullen, Sloman, & Cantor
ATTORNEYS 3,403,579
OUTSIDE REAR VIEW REMOTE CONTROLLED
MIRROR FOR VEHICLES
Robert A. Casalou, 7357 W. Greenwich Drive,
Birmingham, Mich. 48010
Filed Nov. 22, 1966, Ser. No. 596,298
1 Claim. (Cl. 74—501)

The present invention relates to a remote controlled rear view mirror for vehicles.

It is an object of the present invention to provide an improved rear view mirror with a remote control for effecting in a simplified manner universal adjustments of the mirror from the interior of the vehicle.

This and other objects will be seen from the following specification and claim in conjunction with the appended drawing in which:

FIG. 1 is a fragmentary side elevation view of a vehicle showing the present rear view mirror mounted thereon.

FIG. 2 is a fragmentary vertical section of the rear view mirror and the control connections therefore.

FIG. 3 is a fragmentary section taken in the direction of arrows 3—3 of FIG. 2, and on an increased scale.

FIG. 4 is a fragmentary section on an increased scale taken in the direction of arrows 4—4 of FIG. 2.

It will be understood that the above drawing illustrates merely a preferred embodiment of the invention and that other embodiments are contemplated within the scope of the claims hereinafter set forth.

Referring to the drawing the vehicle body 11 is shown fragmentarily in FIG. 1 and having mounted thereon such as on the door or fender the present remote controlled rear view mirror, generally indicated at 12.

Said rear view mirror includes base 13. secured by fasteners 14 upon some portion of the vehicle body, such as shown in FIG. 2, the base terminating in the upright pedestal 15, with bore 16.

Hollow longitudinally extending housing 17 is mounted upon the upper end of the pedestal, there being a suitable bushing 18 nested within the upper end portion of said pedestal and communicating with the interior of said housing.

The outwardly opening aspherical socket 19 includes an annular flange 20, which engages within one end of housing 17 and is fixedly secured therein by a series of fasteners 21.

The preformed shell 22 is flanged over peripherally at 23 to retain therein mirror 24. The shell 22 at its rear is inwardly concave at 26 and includes the rearwardly extending ball support 25 movably nested within the socket 19.

The shaft 27 is fixed to and projects from the ball 25, through an aperture in the base of the socket 19 and axially of housing 17. It has mounted axially thereon the control tube 28, FIGS. 2 and 3.

Snap ring 29 is interlocked with the shaft 27 and is normally spaced from the flanged sleeve 30, which is mounted over said shaft and bears against the socket 19. A suitable coiled spring 31 is interposed between snap ring 27 and the flanged sleeve 30, normally biasing the ball 25 into socket 19 for universal movement therein.

Ball 32 is movably mounted within the control tube 28. The crank 35 includes towards one end an upright shaft 33 which extends through and is secured to ball 32, with end portions of said shaft guidably movable within the elongated slot 34, opening outwardly of one end of the control tube 28, as best shown in FIG. 4.

The crank 35 at its inner end is secured to one end of the rotative and reciprocal piston 36 movably mounted within the bushing 18, FIG. 2.

The control cable 37 rotatively positioned within the sheath 38 for rotative as well as longitudinal movement therein is secured to the other end of piston 36, extends down through the bore 16 of the pedestal 15, and towards its outer end has a cylindrical guide portion 39 terminating in the knob 40. The said guide portion 39 is journalled and supported within the elongated exteriorly threaded tube support 41 which extends through a portion of the body as shown at 42 and is secured thereto by the nuts 43.

By this construction knob 40 may be rotated causing corresponding rotary movement of the cable 37 and the crank 35. This, in turn, causes reciprocal transverse adjustments of the control tube 28 in a horizontal plane due to the cooperative movement of the ball 32 within the control tube 28, FIGS. 2, 3 and 4.

At the same time the knob 40 is adapted for longitudinal reciprocal adjustment with respect to the guide 41 effecting corresponding reciprocal adjustment of the cable 37 and for effecting corresponding reciprocal movements of piston 36 within the bushing 18. Such movements will effect reciprocal adjustments of the control tube 28 in a vertical plane. Accordingly the remote control knob 40 is capable of effecting universal adjustments of the mirror 24 with respect to the housing 17.

Having described my invention reference should now be had to the following claim.

I claim:
1. In a remote controlled rear view mirror for a vehicle having a body;
   a pedestal having a bore mounted on said body;
   a housing on said pedestal;
   an outwardly opening centrally apertured aspherical socket on one end of the housing;
   a universally movable shell mounting a mirror and including a ball support movably nested in said socket;
   a shaft projecting from said ball axially into the housing;
   resilient means biasing the ball into said socket;
   a control tube in said housing axially mounted on said shaft and including an elongated slot therethrough;
   a ball nested in said tube and longitudinally movable therein;
   a crank including a shaft extending through and secured to said ball with its projecting end portions guidable movable within said tube slot;
   a rotative piston reciprocally movable in said pedestal at right angles to said tube and at one end secured to said crank;
   a flexible cable mounted on said body with one end extending up into said pedestal and secured to the other end of said piston;
   the other end of said cable guidably extending through the body and into the passenger area;
   and a control knob on the end of said cable;
   selective rotation and reciprocal longitudinal adjustment of said knob adapted to effect universal adjustment of said mirror shell relative to said housing.

References Cited

UNITED STATES PATENTS

| | | | |
|---|---|---|---|
| 2,614,437 | 10/1952 | Meggitt | 74—501 |
| 2,917,972 | 12/1959 | Bonaguro | 74—501 X |
| 2,919,599 | 1/1960 | Milton et al. | 74—503 X |
| 3,253,509 | 5/1966 | Peters. | |

MILTON KAUFMAN, *Primary Examiner.*